US006512848B2

(12) United States Patent
Wang et al.

(10) Patent No.: US 6,512,848 B2
(45) Date of Patent: *Jan. 28, 2003

(54) PAGE ANALYSIS SYSTEM

(75) Inventors: Shin-Ywan Wang, Tustin, CA (US); Toru Niki, Irvine, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/751,677

(22) Filed: Nov. 18, 1996

(65) Prior Publication Data

US 2001/0012400 A1 Aug. 9, 2001

(51) Int. Cl.$^7$ .................................................. G06K 9/34
(52) U.S. Cl. ...................................... 382/176; 358/462
(58) Field of Search ................................ 382/173, 174, 382/175, 176, 177, 180, 190, 179, 202, 204, 228, 232, 245, 289, 290, 291, 317; 358/261.1, 462, 464, 453

(56) References Cited

U.S. PATENT DOCUMENTS

| | | | |
|---|---|---|---|
| 4,933,984 A | 6/1990 | Nakano et al. | 382/175 |
| 5,048,107 A | 9/1991 | Tachikawa | 382/173 |
| 5,065,442 A | 11/1991 | Kugai | 382/179 |
| 5,075,895 A | 12/1991 | Bessho | 382/175 |
| 5,091,964 A | 2/1992 | Shimomura | 382/174 |
| 5,093,868 A | 3/1992 | Tanaka et al. | 382/177 |
| 5,101,439 A | 3/1992 | Kiang | 382/174 |
| 5,101,448 A | 3/1992 | Kawachiya et al. | 382/287 |
| 5,129,012 A | 7/1992 | Abe | 382/190 |
| 5,307,422 A | 4/1994 | Wang | 382/177 |
| 5,313,526 A | 5/1994 | Cheong | 382/176 |
| 5,335,290 A | 8/1994 | Cullen et al. | 382/176 |
| 5,351,314 A | 9/1994 | Vaezi | 382/264 |
| 5,436,983 A * | 7/1995 | Bernzott et al. | 382/228 |
| 5,465,304 A * | 11/1995 | Cullen et al. | 382/176 |
| 5,588,072 A | 12/1996 | Wang | 382/176 |

FOREIGN PATENT DOCUMENTS

| | | |
|---|---|---|
| EP | 325417 A3 | 7/1989 |
| EP | 496531 A2 | 7/1992 |
| JP | 63-116569 | 5/1988 |
| JP | 4-90083 | 3/1992 |
| WO | 80 02761 | 12/1980 |
| WO | 92 06448 | 4/1992 |

OTHER PUBLICATIONS

"Method Of Differentiating Image From Text Within Documents", IBM Technical Disclosure Bulletin, vol. 34, No. 11, Apr. 1992, pp. 22–23.

"Line Segmentation Method For Documents In European Languages", IBM Technical Disclosure Bulletin, vol. 33, No. 1B, Jun. 1990, pp. 207–210.

T. Akiyama, et al., "Automated Entry System For Printed Documents", Pattern Recognition, vol. 23, No. 11, 1990, pp. 1141–1154.

(List continued on next page.)

Primary Examiner—Samir Ahmed
(74) Attorney, Agent, or Firm—Fitzpatrick, Cella, Harper & Scinto

(57) ABSTRACT

A method for increasing the accuracy of image data classification in a page analysis system for analyzing image data of a document page. The method includes inputting image data of a document page as pixel data, analyzing the pixel data in order to locate all connected pixels, rectangularizing connected pixel data into blocks, analyzing each of the blocks of pixel data in order to determine the type of image data contained in the block, outputting an attribute corresponding to the type of image data determined in the analyzing step, and performing optical character recognition to attempt to recognize a character of the block of image data in the case that the analyzing step cannot determine the type of image data contained in the block.

24 Claims, 12 Drawing Sheets

OTHER PUBLICATIONS

P. Bones, et al., "Segmentation of Document Images", SPIE Image Communications and Workstations, vol. 1258, 1990, pp. 78–88.

V. A. Cordi, "Virtual Memory Hierarchy", IBM Technical Disclosure Bulletin, vol. 21, No. 10, Mar. 1979, pp. 4001–4004.

W. Doster, et al., "A Step Towards Intelligent Document Input To Computers", et al., Institute of Electrical and Electronics Engineers, 1983, pp. 515–516.

J. Fisher, et al., "A Rule–Based System For Document Image Segmentation", Proceedings of 10th International Conference on Pattern Recognition, 1990, pp. 567–572.

L. A. Fletcher, et al., "A Robust Algorithm For Text String Separation From Mixed Text/Graphics Images", Institute of Electrical and Electronics Engineers Transactions On Pattern Analysis and Machine Intelligence, vol. 10, No. 6, Nov., 1988, pp. 910–918.

K. Inagaki, et al., "Macsym: A Hierarchical Parallel Image Processing System For Event–Driven Pattern Understanding Of Documents", 1023 Pattern Recognition, vol. 17, No. 1, 1984, pp. 85–108.

O. Iwaki, et al., "A Segmentation Method Based On Office Document Hierarchical Structure", Proceeding of the 1987 Institute of Electrical And Electronics Engineers International Conference on Systems, Man, and Cybernetics, vol. 2, pp. 759–763.

Q. Luo, et al. "A Structure Recognition Method For Japanese Newspapers", Symposium on Document Analysis and Information Retrieval, Mar. 1992, pp. 217–234.

H. Makino, "Representation And Segmentation Of Document Images", Institute of Electrical and Electronics Engineers, 1983, pp. 291–296.

I. Masuda, et al., "Approach to Smart Document Reader System", Institute of Electrical and Electronics Engineers, 1985, pp. 550–557.

M. Mizuno, et al., "Document Recognition System With Layout Structure Generator", NEC Research And Development, vol. 32, No. 3, Jul. 1991, pp. 430–437.

G. Nagy, et al., "A Prototype Document Image Analysis System for Technical Journals", Computer, Jul. 1992, pp. 10–22.

M. Okamoto, et al., "A Hybrid Page Segmentation Method", Proceedings of the Second International Conference on Document Analysis and Recognition, Oct. 1993, pp. 743–748.

A. Pizano, et al., "A Business Form Recognition System", COMPSAC91 Proceedings, The Fifteenth Annual International Computer Software & Applications Conference, Sep. 13, 1991, pp. 626–632.

Y. Tang, et al., "Document Analysis And Understanding: A Brief Survey", ICDAR, First International Conference on Document Analysis and Recognition, France, Sep. 30–Oct. 2, 1991, pp. 17–31.

S. Tsujimoto, et al., "Understanding Multi–articled Documents, "10th International Conference on Pattern Recognition, Institute of Electrical and Electronics Engineers, vol. 1, Jun. 16–21, 1990, pp. 551–556.

F. Wahl, "A New Distance Mapping and Its Use for Shape Measurement on Binary Patterns", Computer Vision, Graphics, And Image Processing, vol. 23, pp. 218–226, 1983.

K.Y. Wong, et al., "Document Analysis Systems", IBM J. Res. Develop., vol. 26, No. 6, Nov., 1982, pp. 647–656.

M. Yamada, et al., "Document Image Processing Based on Enhanced Border Following Algorithm", Proceedings of the 10th International Conference on Pattern Recognition, vol. 2, Jun. 21, 1990, pp. 231–235.

\* cited by examiner

PAGE ANALYSIS SYSTEM

BACKGROUND OF THE INVENTION

1. Field of the Invention

The present invention relates to a page analysis system for analyzing image data of a document page by utilizing a block selection technique, and particularly to such a system in which blocks of image data are classified based on characteristics of the image data. For example, blocks of image data may be classified as text data, titles, half-tone image data, line drawings, tables, vertical lines or horizontal lines.

2. Incorporation by Reference

U.S. patent applications Ser. No. 07/873,012, "Method And Apparatus For Character Recognition", Ser. No. 08/171,720, "Method And Apparatus For Selecting Text And Or Non-Text Blocks In A Stored Document", Ser. No. 08/596,716, "Feature Extraction System For Skewed And Multi-Orientation Documents", and Ser. No. 08/338,781, "Page Analysis System", which are commonly owned by the assignee of the present invention, are incorporated herein by reference.

3. Description of the Related Art

Recently developed block selection techniques, such as the techniques described in the aforementioned U.S. patent application Ser. Nos. 07/873,012 and 08/171,720, are used in page analysis systems to provide automatic analysis of image data within a document page. In particular, these techniques are used to distinguish between different types of image data within the page. The results of such techniques are then used to choose a type of processing to be subsequently performed on the image data, such as optical character recognition (OCR), data compression, data routing, etc. For example, image data which a block selection technique has designated as text data is subjected to OCR processing, whereas image data which is designated as picture data is subjected to data compression. Due to the foregoing, various types of image data can be input and automatically processed without requiring user intervention.

Block selection techniques are most beneficial when applied to composite documents. FIG. 1 shows an image of composite document page 1 as it appears after being subjected to a block selection technique. Document page 1 includes a logo within block 2, a large font title within blocks 3 to 6, large font decorative text within block 7, text-sized decorative font within blocks 8 to 13, various text-sized symbols within blocks 14 to 27 and a small symbol pattern within blocks 28 to 35.

Block selection techniques use a "blocked" document image such as that shown in FIG. 1 to create a hierarchical tree structure representing the document. FIG. 2 shows a hierarchical tree which represents document page 1. The tree consists of root node 101, which represents document page 1, and various descendent nodes. Descendent nodes 102, 102, 104 to 106, 107, 108 to 113, 114 to 127 and 128 to 145 represent blocked areas 2, 3 to 6, 7, 8 to 13, 14 to 27 and 28 to 35, respectively.

In order to construct such a tree, block selection techniques such as those described in U.S. patent application Ser. Nos. 07/873,012 and 08/171,720 search each area of document page 1 to find "connected components". As described therein, connected components comprise two or more pixels connected together in any of eight directions surrounding each subject pixel. The dimensions of the connected components are rectangularized to create corresponding "blocked" areas. Next, text connected components are separated from non-text connected components. The separated non-text components are thereafter classified as, e.g., tables, half-tone images, line drawings, etc. In addition, block selection techniques may combine blocks of image data which appear to be related in order to more efficiently process the related data.

The separation and classification steps are performed by analyzing characteristics of the connected components such as component size, component dimension, average size of each connected component, average size of internal connected components and classification of adjacent connected components. However, despite using complex algorithms in conjunction with the foregoing factors in order to classify blocks of image data, block selection techniques often mis-identify or are unable to identify blocks of data within a document page.

For example, as shown in FIG. 2, a conventional block selection technique may not be able to distinguish the content of blocks 2, 3 and 7 of page 1. Accordingly, corresponding nodes 102, 103 and 107 are designated "unknown".

These problems occur because the classification algorithms applied by conventional block selection techniques are premised on many assumptions relating to data size, e.g., any data which falls within a given size threshold is classified as text data. Accordingly, any text data outside of that threshold will most likely not be characterized as text data. Also, text and non-text connected components are separated based on an assumption that text connected components are usually smaller than picture connected components. In addition, the algorithms also assume that text connected components comprise the majority of the connected components in a document page.

Accordingly, conventional block selection techniques are inherently inaccurate because they rely on assumptions regarding size-related characteristics of document image data and do not attempt to actually recognize the content of the image data.

Mis-identification of document image data due to these inherent inaccuracies results in significant problems when combining related blocks of image data. For example, the combining algorithm used in the present example requires that blocks which a block selection technique has designated as "unknown" be combined with any adjacent text blocks. Accordingly, because "unknown" blocks 2 and 3 of document page 1 are adjacent to "text" blocks 4 to 6, these blocks are grouped together to form "text" block 36, shown in FIG. 3. Therefore, the logo within original block 2 will be mistakenly processed as text. As also shown in FIG. 3, blocks 7 to 13, 14 to 27 and 28 to 35 are combined into single "text" blocks 38, 39 and 40, respectively.

Techniques have been developed to address the tendency of existing block selection techniques to mis-identify and/or erroneously combine image data. For example, U.S. patent application Ser. No. 08/361,240 describes a method for reviewing the data classifications resulting from a block selection technique and for editing the classifications in the case that any image data was misidentified by the block selection technique. However, such techniques require operator intervention and are therefore not adequate in cases where automation of the block selection technique is required.

SUMMARY OF THE INVENTION

The present invention relates to a method for classifying blocks of image data within a document page which utilizes optical character recognition processing to address shortcomings in existing block selection techniques.

Thus, according to one aspect of the invention, the present invention is a method for increasing the accuracy of image data classification in a page analysis system for analyzing image data of a document page. The method includes inputting image data of a document page as pixel data, analyzing the pixel data in order to locate all connected pixels, rectangularizing connected pixel data into blocks, analyzing each of the blocks of pixel data in order to determine the type of image data contained in the block, outputting an attribute corresponding to the type of image data determined in the analyzing step, and performing optical character recognition so as to recognize the type of image data in the block of image data in the case that the analyzing step cannot determine the type of image data contained in the block.

In another aspect, the present invention is a method for accurately classifying image data in a page analysis system for analyzing image data of a document page. The method includes inputting image data of a document page as pixel data, combining and rectangularizing connected pixel data into blocks of image data, and analyzing and classifying the data as a type of data. In the case that the type of data is indicated as text data and a size of the text data is outside a predetermined size threshold, the method further comprises performing optical character recognition on the text data.

This brief summary has been provided so that the nature of the invention may be understood quickly. A more complete understanding of the invention can be obtained by reference to the following detailed description of the preferred embodiments in connection with the attached drawings.

DETAILED DESCRIPTION OF THE PREFERRED EMBODIMENTS

Figure 4:
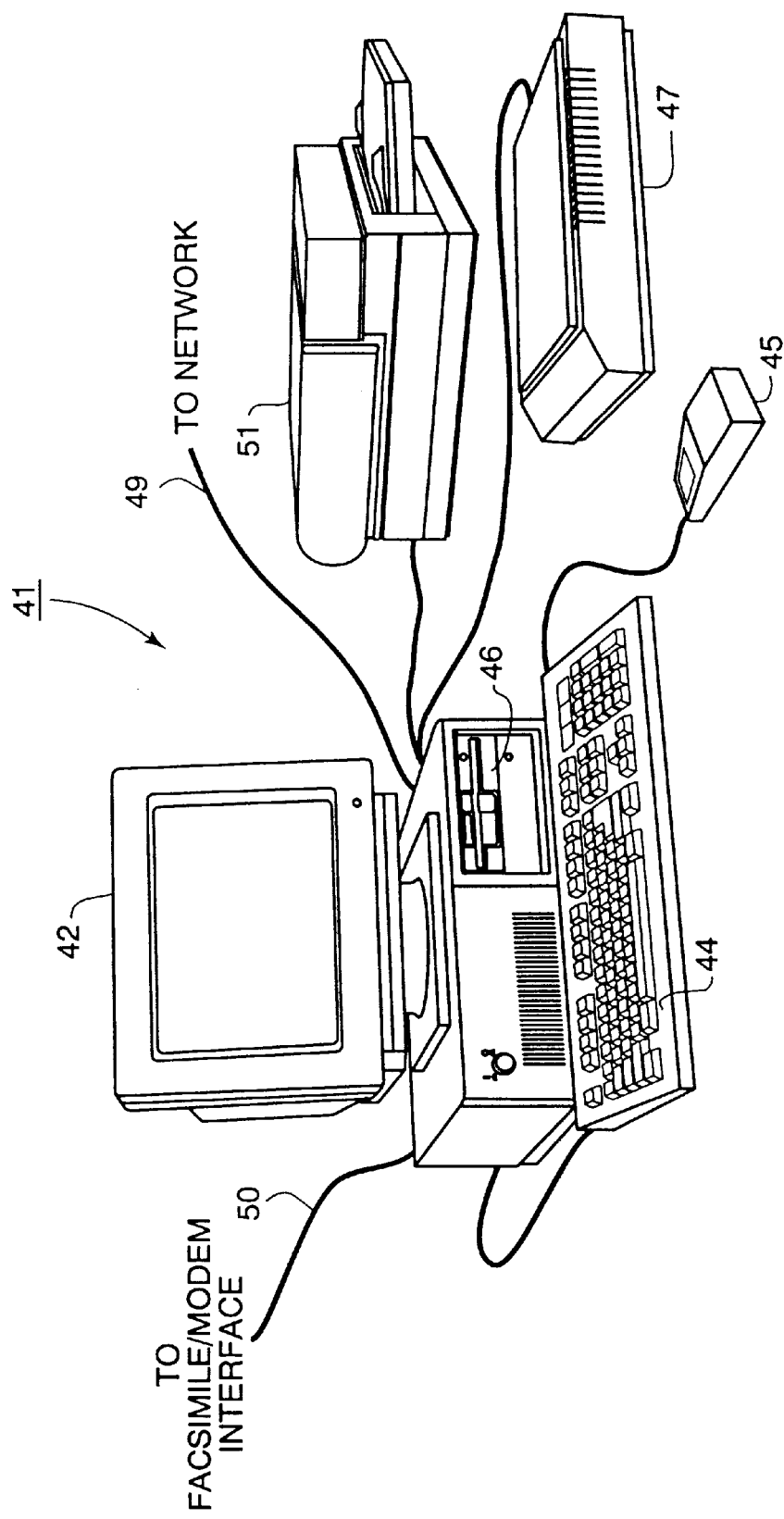
FIG. 4 is a perspective view showing the outward appearance of an apparatus according to the present invention.

FIG. 4 is a view showing the outward appearance of a representative embodiment of the present invention. Shown in FIG. 4 is computer system 41, which may be a Macintosh or IBM PC or PC-compatible system having a windowing environment, such as Microsoft Windows™. Provided with computer system 41 is display screen 42 such as a color monitor, keyboard 44 for entering user commands, and pointing device 45 such as a mouse for pointing to and for manipulating objects displayed on display screen 42.

Computer system 41 also includes a mass storage device such as computer disk 46 for storing data files which include document image files in either compressed or uncompressed format, and for storing computer executable process steps embodying the present invention. Scanner 47 may be used to scan documents so as to provide bit map images of those documents to computer system 41. Documents may also be input into computer system 41 from a variety of other sources, such as from network interface 49 or from other sources such as the World Wide Web through facsimile/modem interface 50 or through network interface 49. Printer 51 is provided for outputting processed document images.

It should be understood that although a programmable general purpose computer system is shown in FIG. 4, a dedicated, or stand-alone, computer or other type of data processing equipment can be used to execute the process steps of the present invention.

Figure 5:
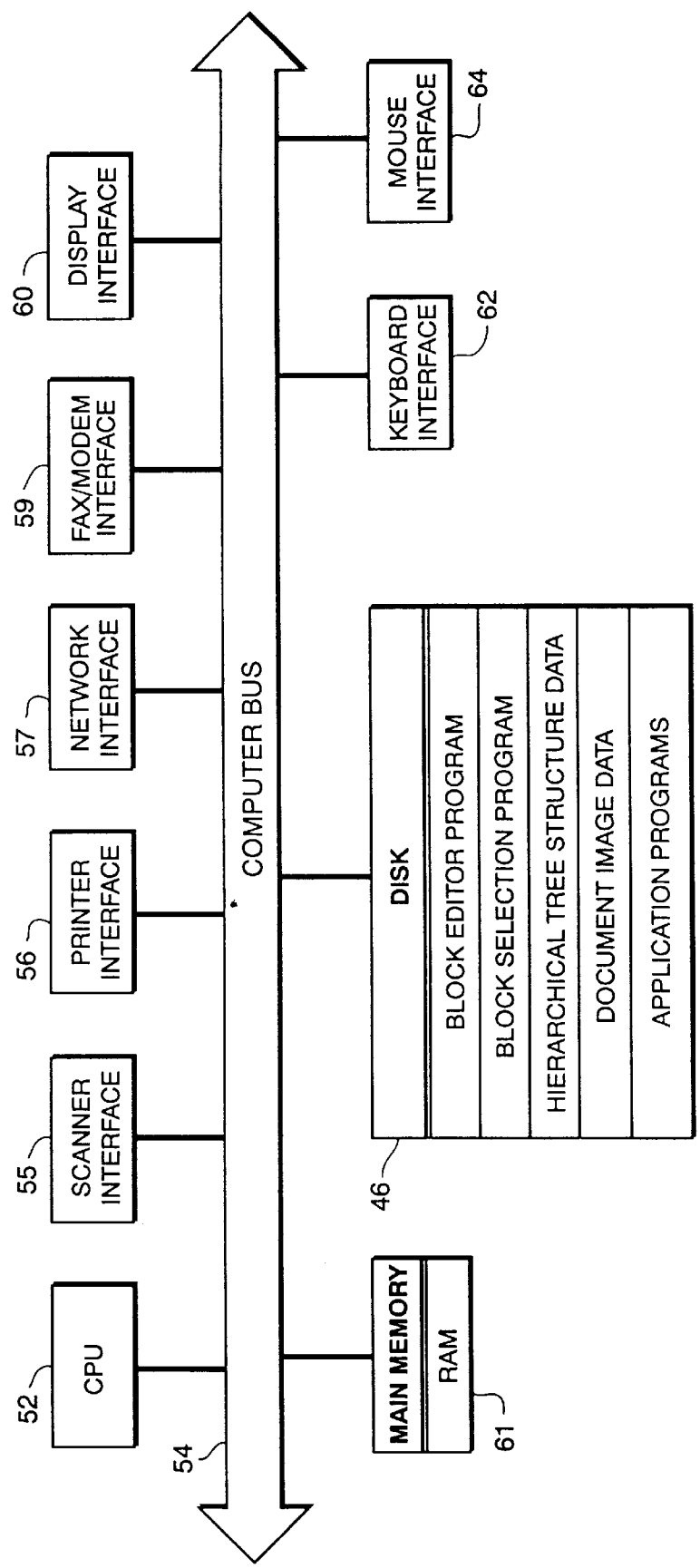
FIG. 5 is a block diagram of the FIG. 3 apparatus.

FIG. 5 is a detailed block diagram showing the internal construction of computer system 41. As shown in FIG. 5, computer system 41 includes central processing unit ("CPU") 52 which interfaces with computer bus 54. Also interfaced with computer bus 54 is scanner interface 55, printer interface 56, network interface 57, facsimile/modem interface 59, display interface 50, main random access memory ("RAM") 51, disk 46, keyboard interface 62 and mouse interface 64.

Main memory 61 interfaces with computer bus 54 so as to provide RAM storage to CPU 52 for executing stored process steps such as the process steps of a block selection technique according to the present invention. More specifically, CPU 52 loads process steps from disk 46 into main memory 61 and executes the stored process steps from memory 61 in order identify and classify image data within a document page such as document page 1. As shown in FIG. 5, disk 46 also contains document images in either compressed or uncompressed format, hierarchical tree structure data produced by block selection systems, and application program files which include a block selection program and a block selection editor application for editing the results of a block selection program.

Figure 6:
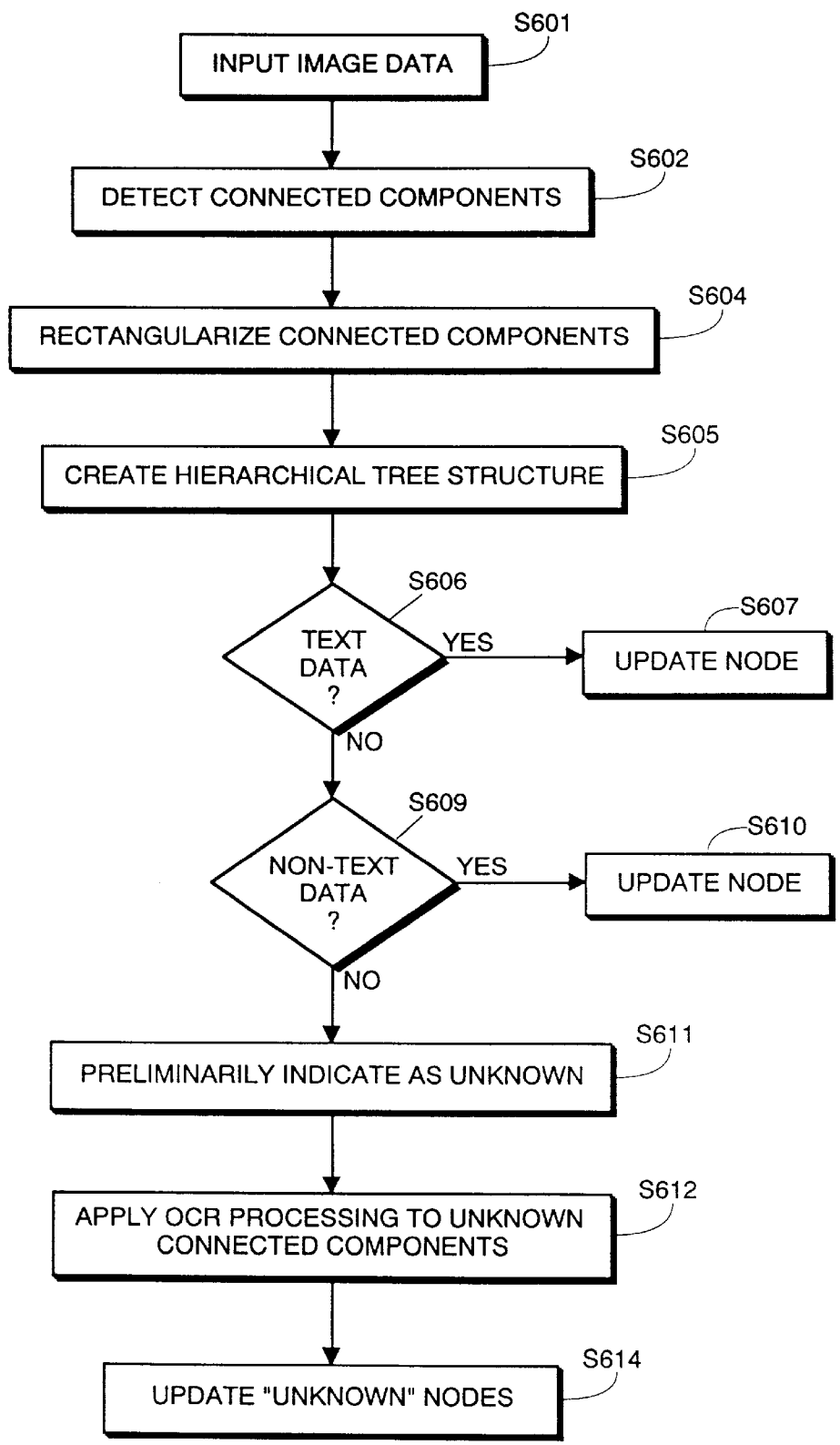
FIG. 6 is a flow diagram describing a method for classifying document image data.

FIG. 6 is a flow diagram describing the block selection technique of the present invention.

In step S601, image data representing document page 1 is input into computer system 41 as pixel data. The document image data may be input either by scanner 47 or by another input means connected to network 49. The image data is subsequently stored in RAM 61. Once input, in step S602, the image data is analyzed so as to detect connected components within document page 1. A connected component is a group of black pixels which is-completely surrounded by white pixels. Each connected component is rectangularized in step S604. Rectangularization results in creating the smallest rectangle that completely circumscribes a connected component. For a further description of rectangularization, the reader's attention is drawn to U.S.

patent application Ser. No. 08/338,781, which is incorporated herein by reference.

Figure 1:
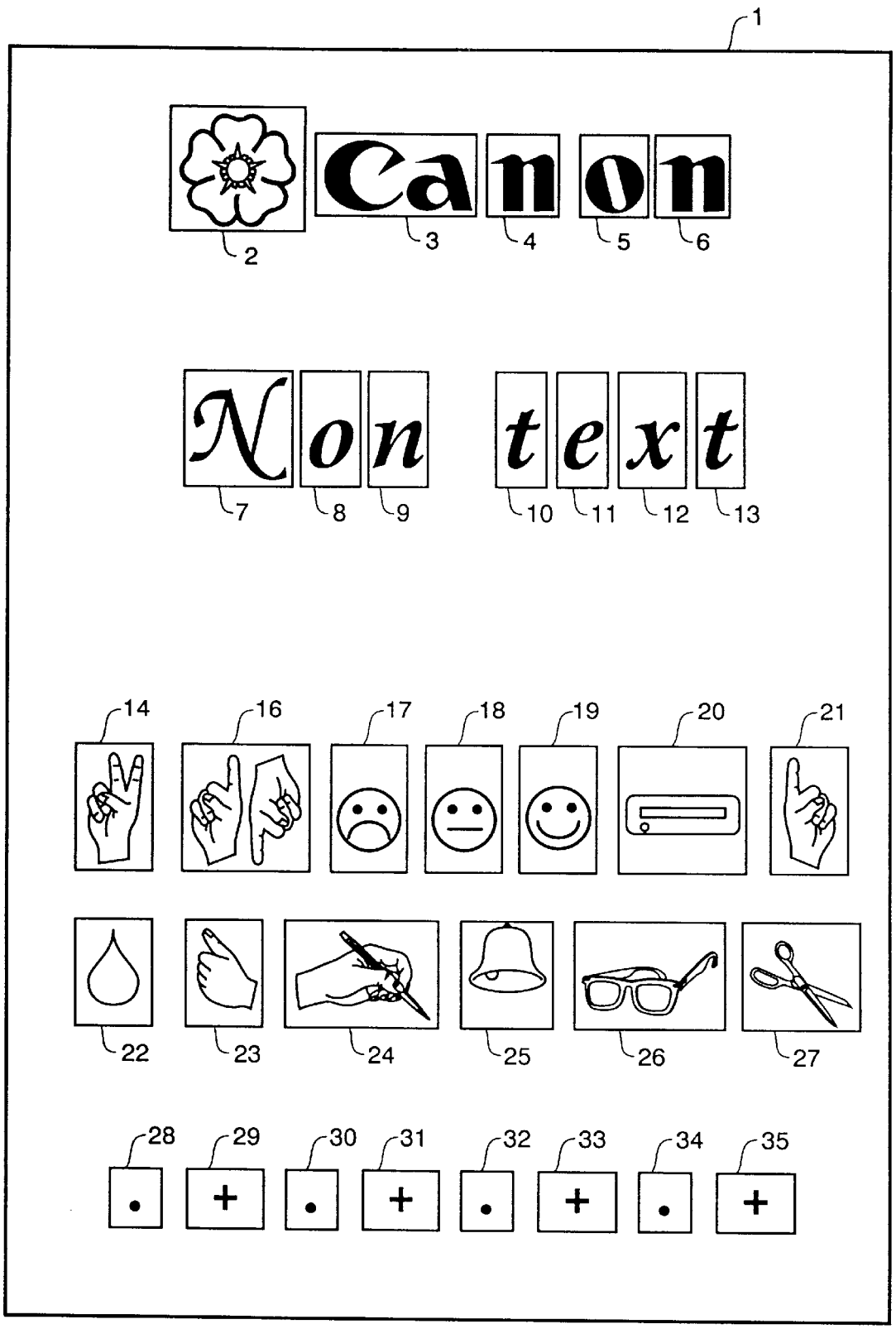
FIG. 1 is a representational view of a document page in which image data has been blocked by a block selection technique.
Figure 2:
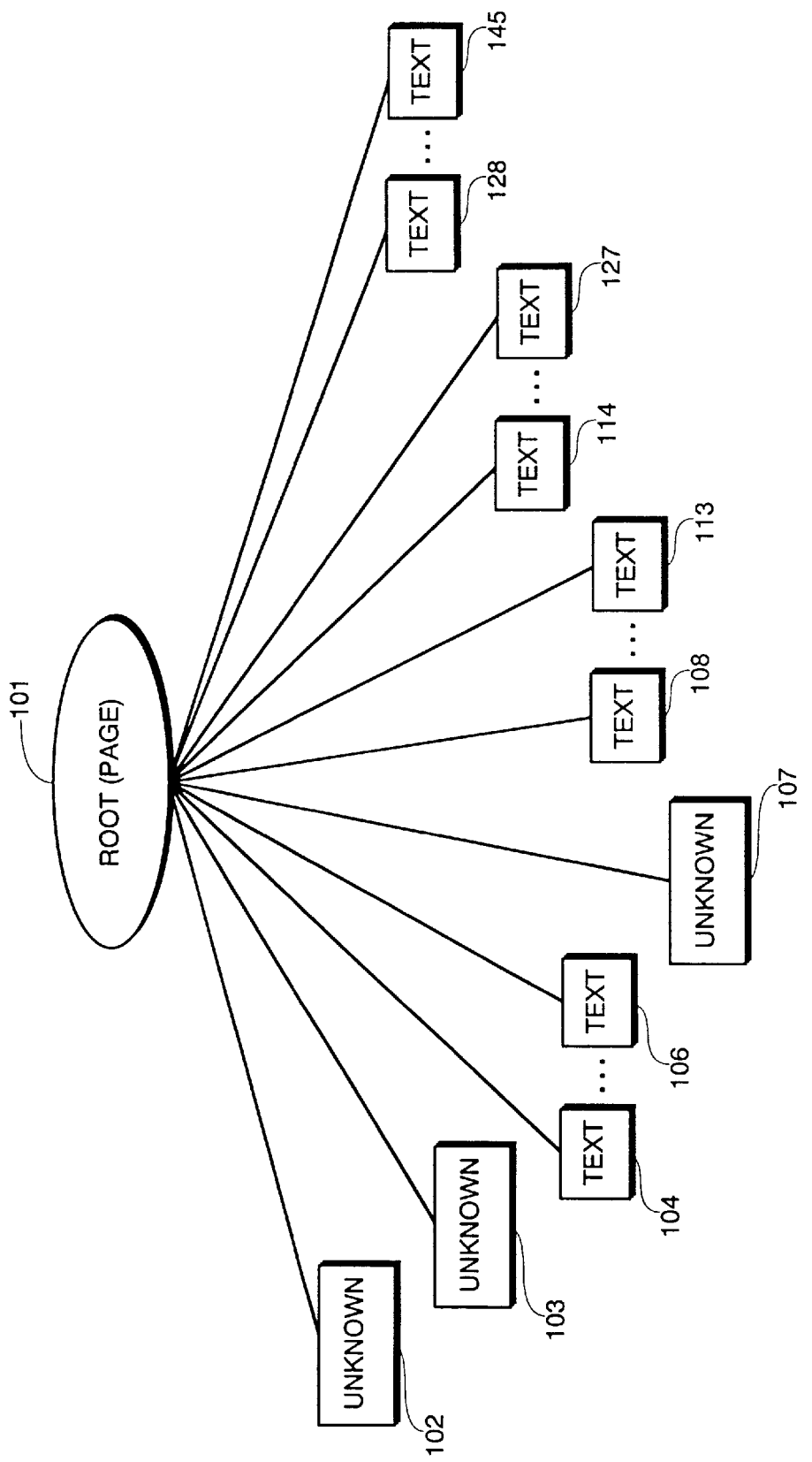
FIG. 2 is a representational view of a hierarchical tree structure corresponding to the document of FIG. 1.

In step S605, a hierarchical tree structure is created by the block selection program. In this regard, the block selection program assigns a node in a hierarchical tree structure corresponding to each rectangular block circumscribing a connectedcomponent, as illustrated by the hierarchical tree structure of FIG. 2, which represents blocked document page 1.

Next, in step S606, each block is analyzed to determine if the connected component within the block meets certain criteria indicative of text data. If the block is smaller than a predetermined threshold size, it is initially determined to be non-text and flow proceeds to step S609. Alternatively, the text/non-text threshold may be based on the average height and width of other rectangles within the page. This text/non-text analysis is described in greater detail in U.S. patent application Ser. No. 07/873,012, which is incorporated herein by reference.

If, in step S606, the block is determined to contain text data, flow proceeds to step S607, in which a node corresponding to the block is updated and an attribute of "text" is appended within the node.

In step S609, the block is analyzed to determine if it contains non-text data. In this regard, in step S609, the block of image data undergoes several types of analysis in order to determine if the non-text data within the block represents a line (horizontal, vertical, dotted or slanted), a joint-line, a picture, line art, a frame, or a table. This classification of non-text data is performed based on complex analysis of various size thresholds and block location information, which are formulated mathematically and calculated dynamically. A more detailed description of non-text classification may be obtained by reference to U.S. patent application Ser. No. 07/873,012, which is incorporated herein by reference.

Non-text analysis continues until the block has been identified as one of a non-text image type or until the block has been tested with respect to each non-text image type without being successfully identified. If the block data is determined to represent one-of the non-text image types, then, in step S610, a corresponding node of the hierarchical tree is updated so as to contain an attribute of the identified non-text image type.

On the other hand, if the block of image data cannot be identified as either text or as one of the non-text image types, then, in step S611, the block is preliminarily indicated as containing "unknown" data. In step S612, the "unknown" block is processed using an optical character recognition (OCR) technique. Thereafter, in step S614, the node of the hierarchical tree structure corresponding to the "unknown" block is updated in accordance with the result of step S612.

Figure 7:
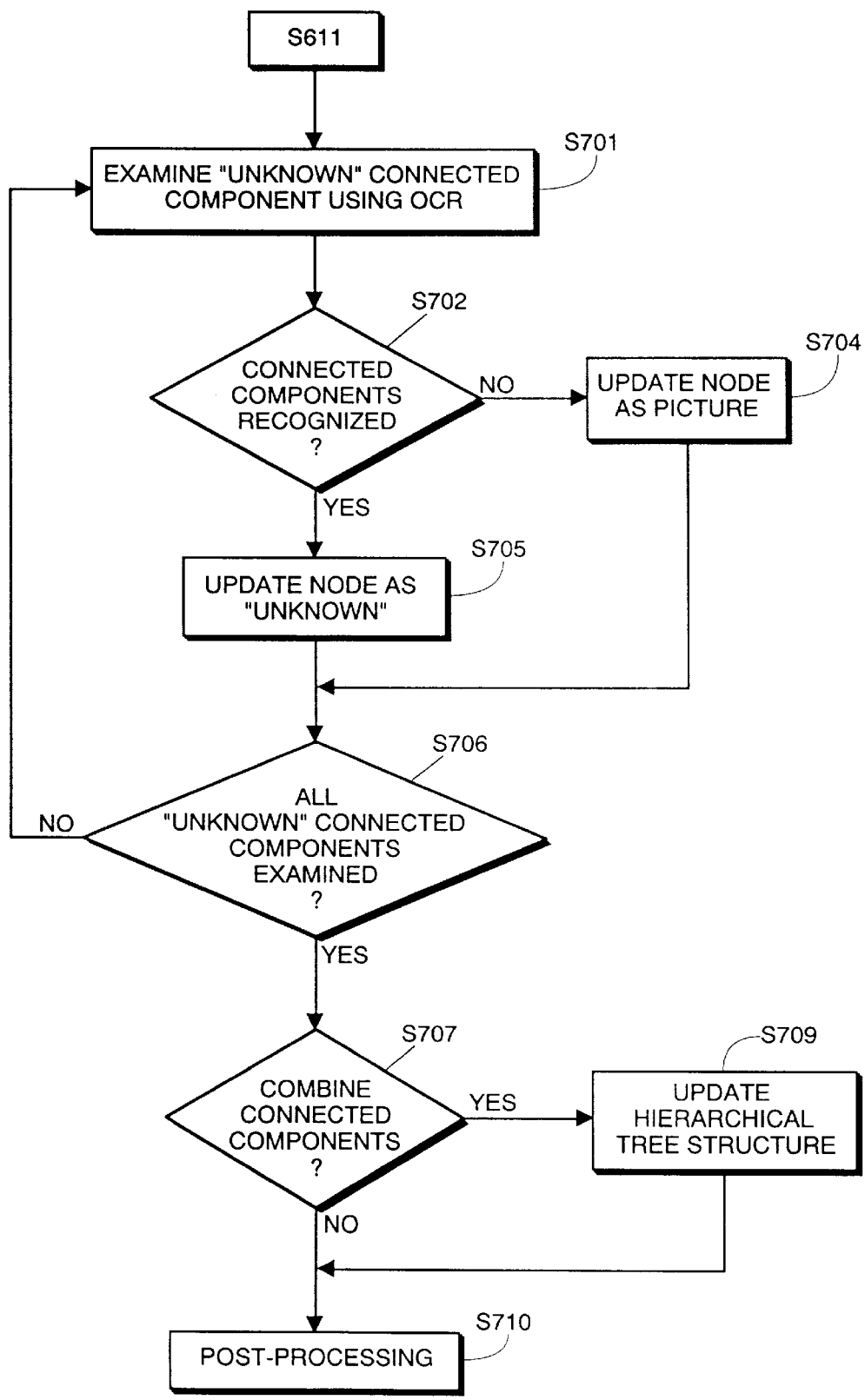
FIG. 7 is a detailed flow diagram describing a method for classifying image data of a document page using optical character recognition.

FIG. 7 is a flow diagram which provides a more detailed description of the processing performed in steps S612 and S614. In step S701, a connected component which waspreliminarily indicated as "unknown" in step S611 is examined using OCR processing. Next, in step S702, if the OCR processing cannot recognize the connected component, flow proceeds to step S704, in which a node corresponding to the component is updated so as to include a "picture" attribute. Flow then proceeds to step S705.

If, in step S702, the OCR processing recognizes the connected component, the corresponding node is updated to include an "unknown" attribute. It may appear that, because the connected component was recognized in step S702, the corresponding node should be updated to include a "text" attribute. However, in the case that an "unknown" block includes text, designating this block as "unknown" does not preclude this block from being combined with a "text" block so as to produce more efficient blocking, as described above. In addition, such a redesignation may cause the "unknown" block, which may contain picture data, to be incorrectly combined with a "text" block during grouping of the blocks, as also described above. Therefore, designating the node corresponding to the recognized connected component as "unknown" results in more efficient processing.

In step S706, the hierarchical tree is examined to determine if all blocks which had previously been preliminarily indicated as containing "unknown" connected components have been examined. If not, flow returns to step S701 and proceeds as described above. If so, flow proceeds to step S707.

Figure 8:
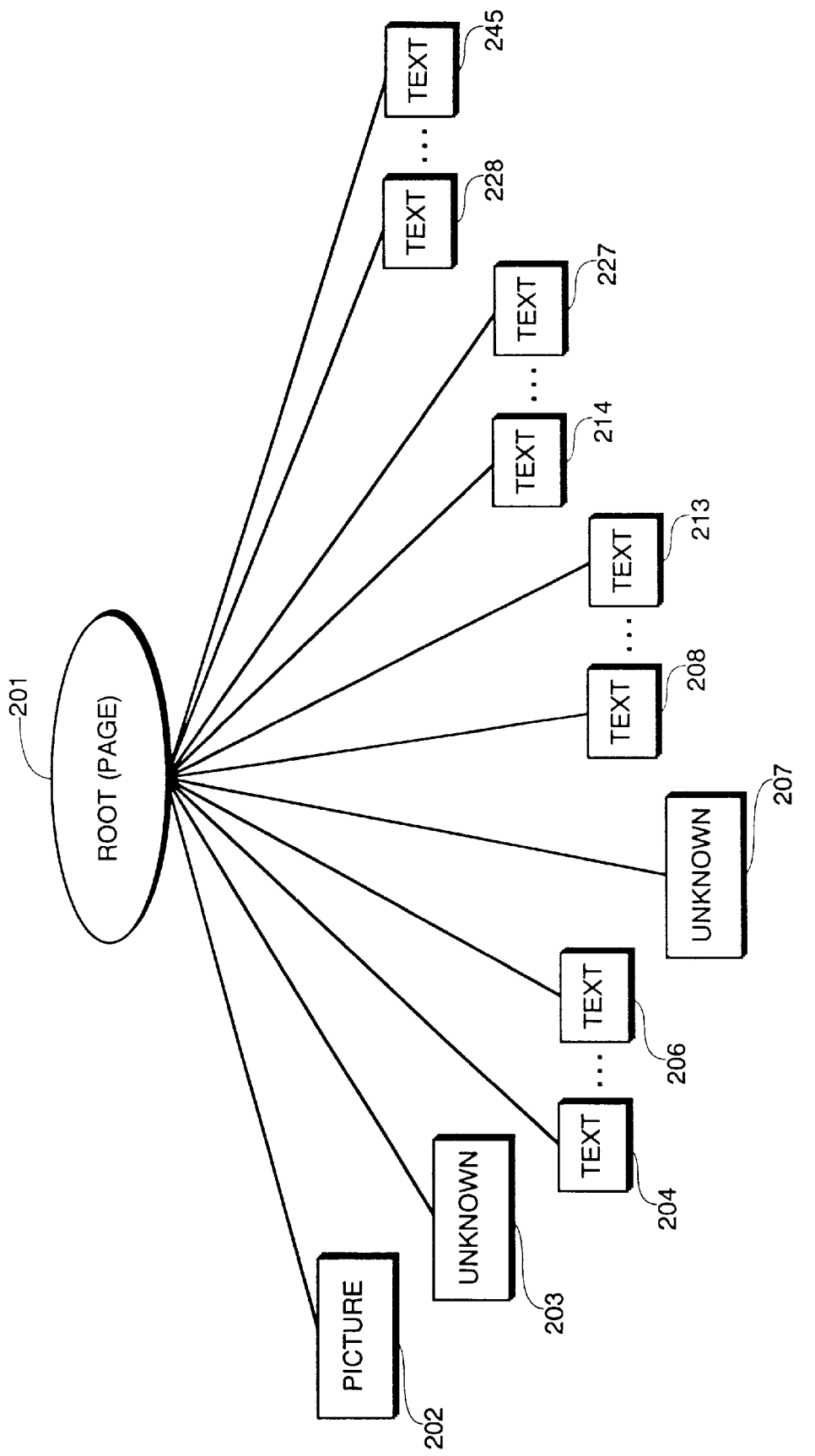
FIG. 8 is a representational view of a hierarchical tree produced by applying a portion of the method of FIGS. 6 and 7 to the FIG. 1 document.

FIG. 8 is a representative view of a hierarchical tree structure which results from the method of FIG. 7, prior to step S707. As shown, "unknown" node 102 has been updated to "picture" node 202. In contrast, because blocks 3 and 7 contain OCR-recognizable connected components, blocks 3 and 7 are represented by "unknown" nodes 203 and 207.

Returning to FIG. 7, in step S707, it is determined whether the blocks of image data within document page 1 should be combined to create larger, more efficiently processabie blocks of image data. If combination is necessary, flow proceeds to step S709, in which a hierarchical tree structure corresponding to document page 1 is updated. Flow then proceeds to step S710.

If, in step S707, it is determined that the blocks do not require combination, flow proceeds to step S710, at which point post-processing of the blocks of image data occurs.

Figure 3:
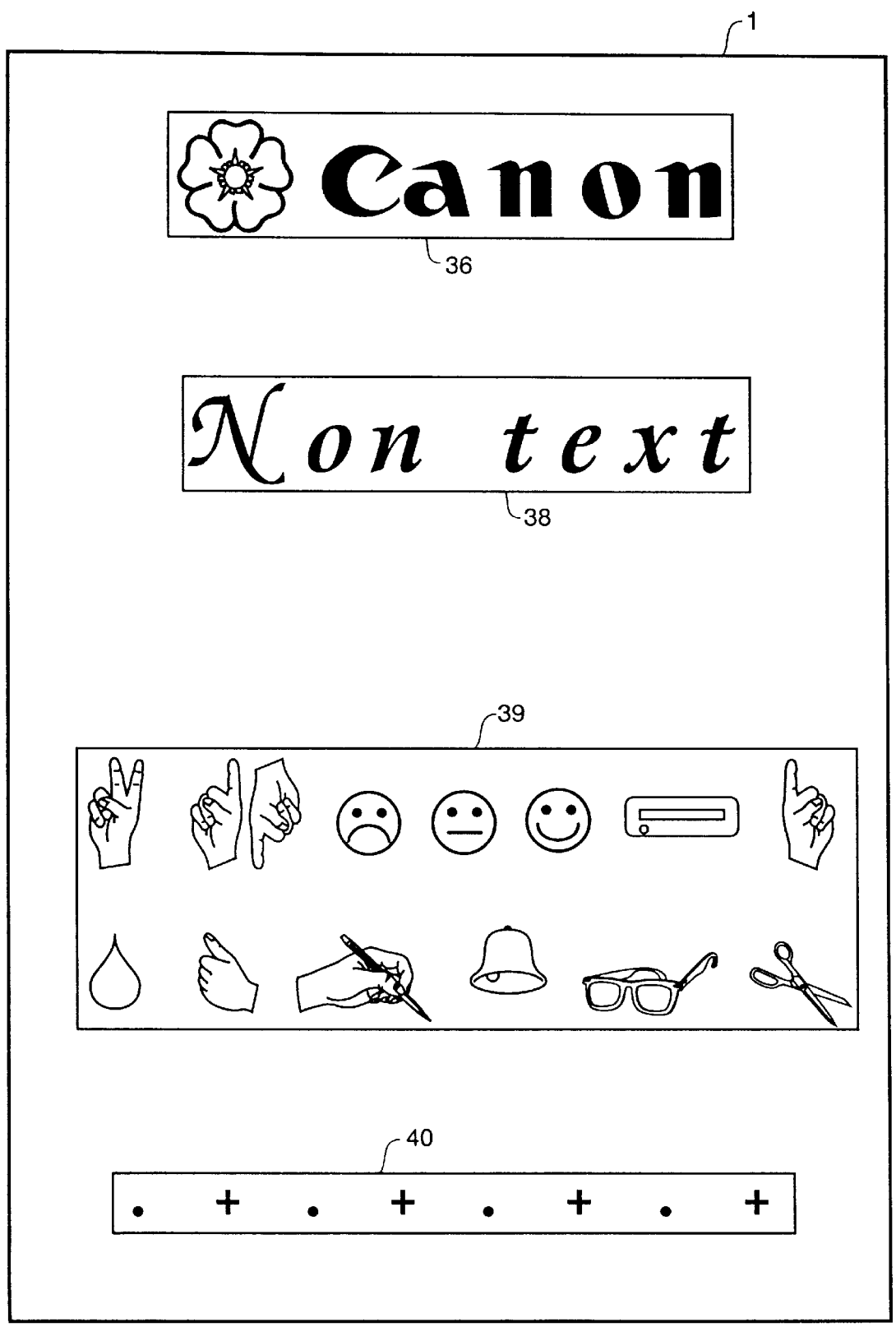
FIG. 3 is a representational view of the document of FIG. 1 wherein the blocked image data has been combined according to a block selection technique.
Figure 9:
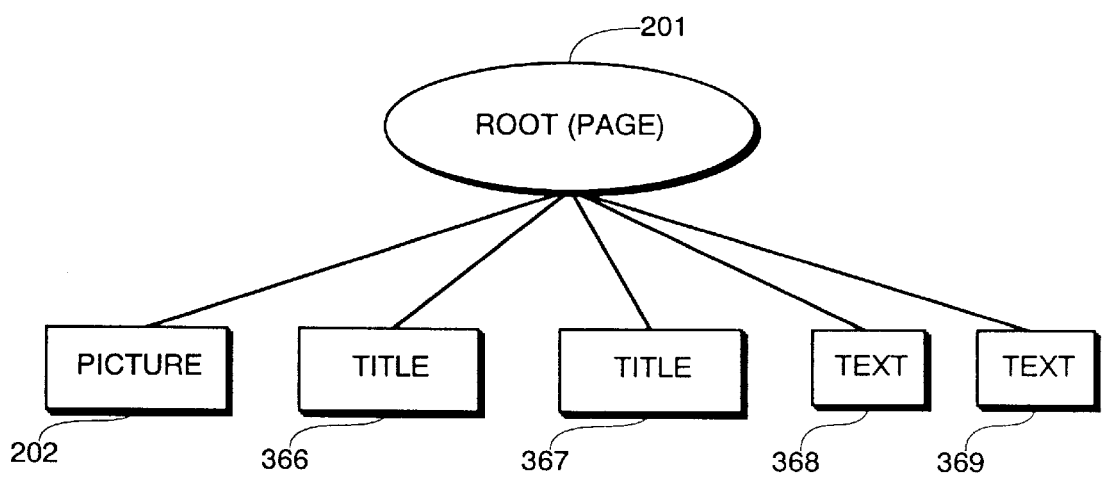
FIG. 9 is a representational view of a hierarchical tree produced by applying the method of FIGS. 6 and 7 to the FIG. 1 document.
Figure 10:
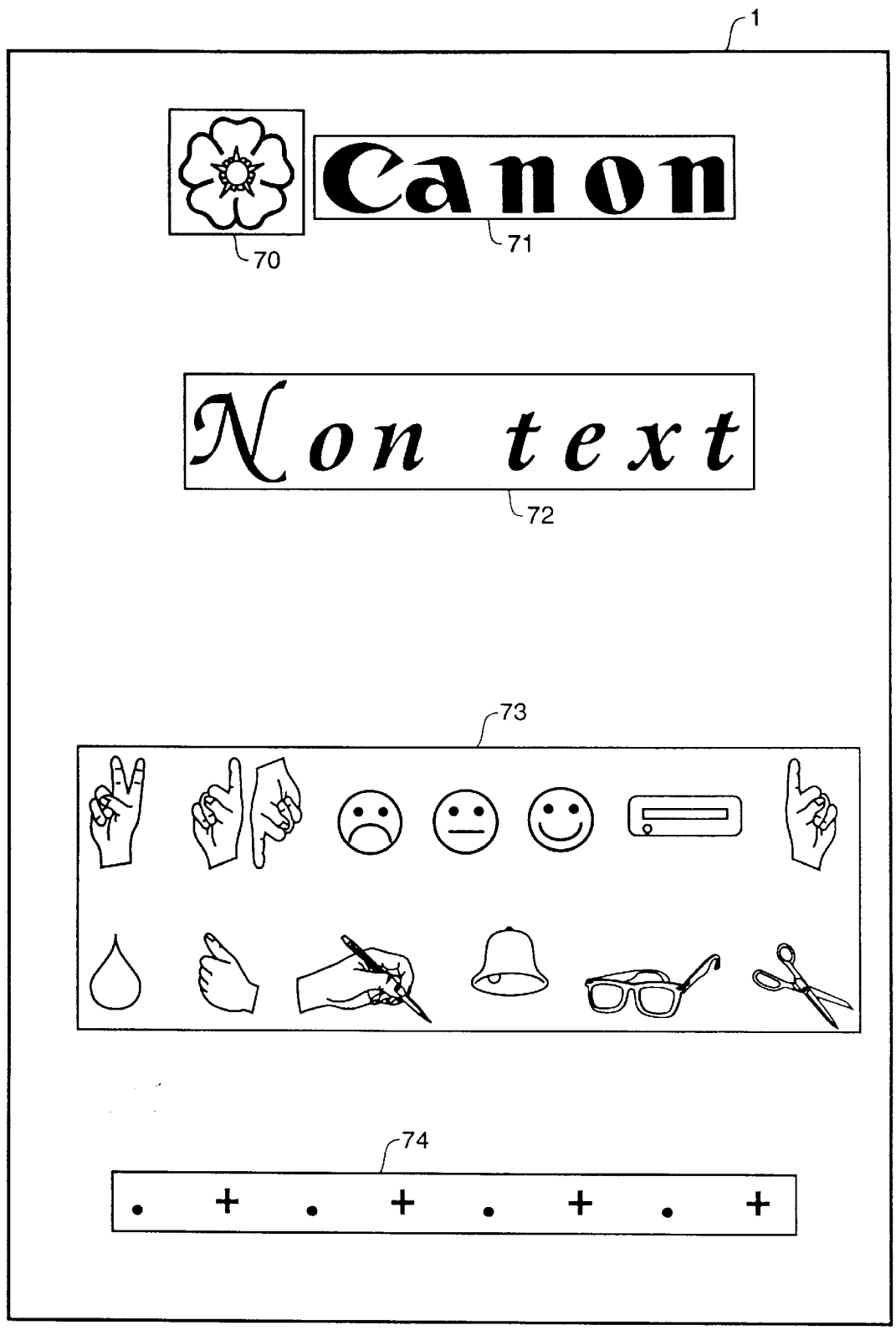
FIG. 10 is a representational view of the FIG. 1 document after being subjected to the method of FIGS. 5 and 6.

FIG. 9 is a representative view of a hierarchical tree structure which results from the method of FIG. 7. Accordingly, "text" nodes 204 to 206 have been grouped with adjacent "unknown" node 203 to form "title" node 366, "text" nodes 208 to 213 have been grouped with adjacent "unknown" node 207 to form "title" node 367, "text" nodes 214 to 227 have been grouped together to form "text" node 368, and "text" nodes 228 to 245 have been grouped together to form "text" node 369. The resulting blocked page 1 is shown in FIG. 10. Advantageously, and in contrast to FIG. 3, "picture" block 70 is not grouped with "text" block 71. Accordingly, the connected component within block 70 may be processed differently than the components of block 71.

Figure 11:
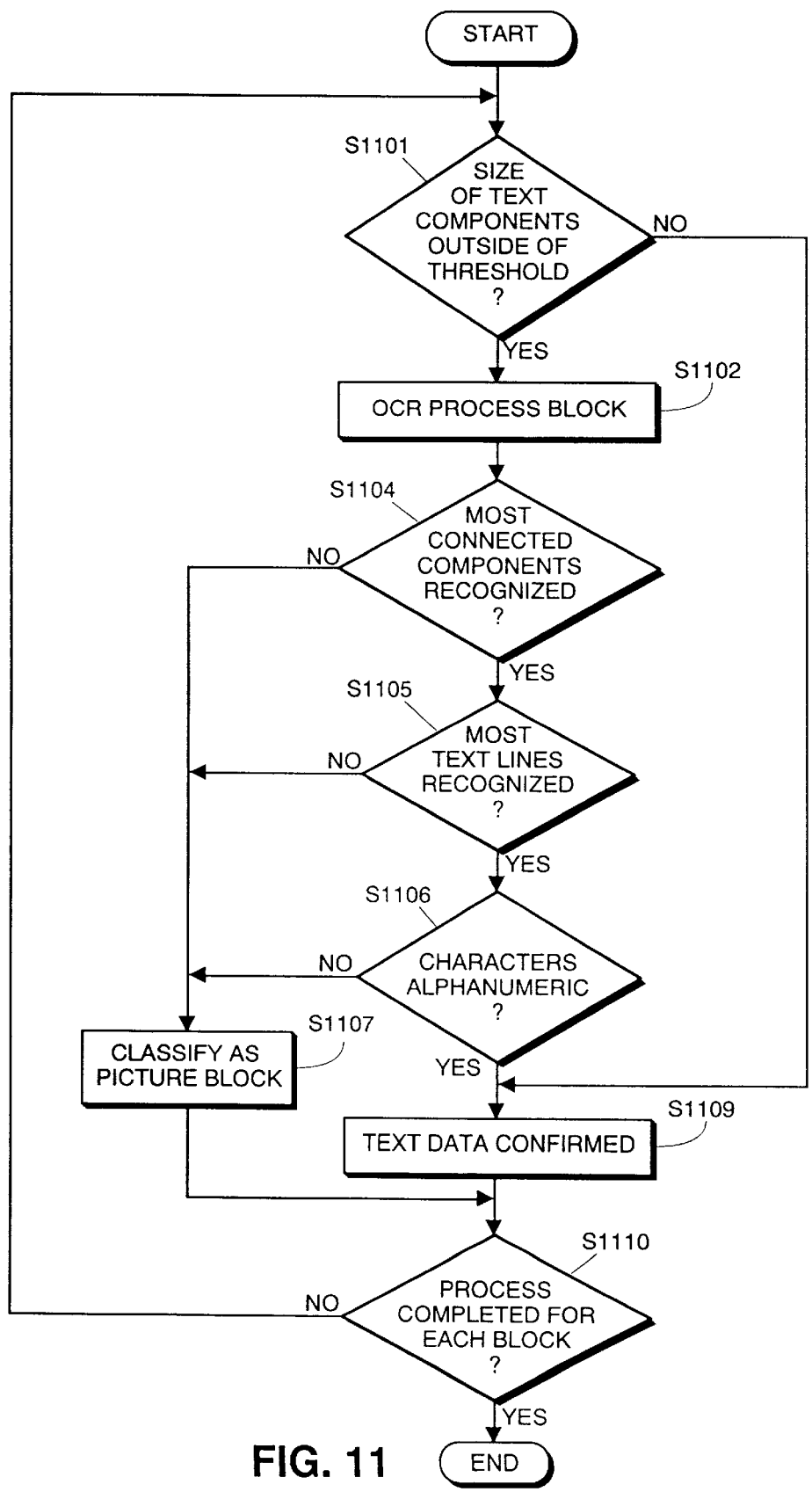
FIG. 11 is a flow diagram for describing a method for classifying image data of a document page using optical character recognition processing.

The method of FIG. 11, to be discussed below, is a post-processing method implemented after a block selection technique has been applied to an image. In particular, the method of FIG. 11 is used to check the accuracy of block selection techniques and to update and correct the hierarchical tree data in preparation for all other post-processing. Although the method of FIG. 11 can be used in conjunction with any block selection technique, the method is described below with reference to the above-described technique to provide continuity to the reader.

Thus, in step S1101, connected components within "text" blocks of document page 1 are compared to a threshold size. In this regard, the threshold size may be based on a fixed size threshold for each document page to be analyzed, such as the threshold-size values described in U.S. patent application Ser. No. 07/873,012, or may be calculated based on the average size of connected components within a document page. Therefore, in step S1101, if the size of most of the connected components within the block is outside of the threshold or if the block is a "title" block, flow proceeds to step S1102 to perform OCR processing on the components within the block. On the other hand, if the text size of most of the connected components within the block falls within the threshold, flow proceeds to step S1109.

Using this method on document page 1 of FIG. 10, the connected components of block 70 would not be evaluated in step S1110 because block 70 is not a "text" block.

Returning to the flow, in step S1104, the results of the OCR processing are examined to indicate whether most of the connected components within the block are recognizable. If not, the block is classified as a "picture" block in step S1107, and flow proceeds to step S1110 and continues as described above.

For example, blocks 72 and 73 do not meet the criteria of step S1104. Accordingly, corresponding nodes 367 and 368 would be reclassified as picture nodes 370 and 371, shown in FIG. 10.

If step S1104 results in an affirmative determination, flow proceeds to step S1105, in which the OCR processing results are examined to determine whether most text lines within the subject block are recognizable. If not, flow proceeds to step S1107 and continues as described above. If most text lines within the block are recognizable, flow proceeds to step S1106.

In step S1106, the OCR processing results are examined to determine whether most of the connected components within the block are alphanumeric. If not, flow proceeds to step S1107. The connected components of "text" block 74, which fall below the threshold size utilized in step S1101, are not alphanumeric and therefore "text" block 74 would be redesignated as "picture" block 372.

Flow then proceeds to step S1110 as described above, wherein, in the case that all blocks of a document image have been analyzed, flow terminates.

If, in step S1106, the OCR processing results indicate that most connected components of the subject block are alphanumeric, flow proceeds to S1109, wherein the "text" attribute of the subject block is confirmed. Flow then proceeds to step S1110, as described above.

Figure 12:
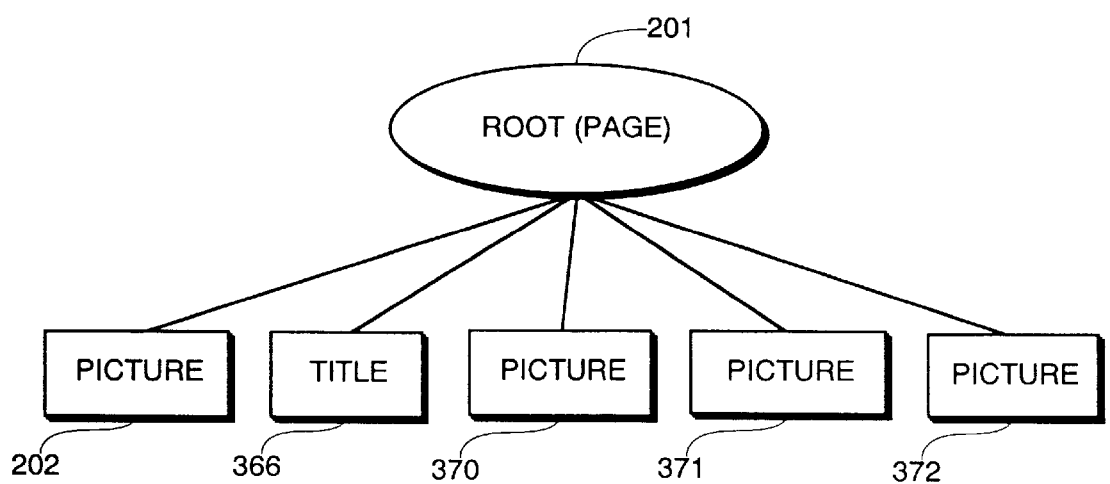
FIG. 12 is a representational view of a hierarchical tree resulting from applying the method of FIG. 11 to the FIG. 10 document page.

For example, "title" block 71 would pass the criteria of each of steps S1104 to S1106 and would therefore remain designated a "title" block. Accordingly, as shown in FIG. 12, the hierarchical tree structure of FIG. 9 has been altered by the method of FIG. 11. Specifically, "title" node 367 and "text" node 368 have been updated as "picture" nodes 370 and 371, and "text" node 369 has been redesignated "picture" node 372.

The method of FIG. 11 therefore utilizes OCR processing to accurately identify image data so that such data can be subjected to proper processing.

Of course, because the methods of FIGS. 6 and 7 and the method of FIG. 11 are employed at different points of a block selection technique, these methods may be used either separately or in conjunction with each other, as described above.

The present invention further contemplates improving existing block selection techniques by employing OCR processing each time connected components within a block are evaluated, such as during separating, classifying and grouping blocks of image data. Therefore, the present invention can be embodied in a page analysis system in which results of OCR processing are used as a criterion in initially separating blocks of document image data into text and non-text blocks and/or in further classifying the blocks according to non-text data types.

Although this system would embody the present invention, it is not a preferred embodiment, since OCR processing is quite time-consuming. Accordingly, it is presently inefficient to employ OCR processing in every situation in which it might be helpful. On the contrary, the foregoing embodiments were developed so as to reduce needless inefficiency resulting from OCR processing by applying such processing in a manner which maximizes its net positive impact.

The invention has been described with respect to particular illustrative embodiments. It is to be understood that the invention is not limited to the above described embodiments and modifications thereto, and that various changes and modifications may be made by those of ordinary skill in the art without departing from the spirit and scope of the appended claims.

What is claimed is:

1. In a page analysis system for analyzing image data of a document page, a method comprising the steps of:
   inputting image data of a document page as pixel data;
   a first analyzing step for analyzing the pixel data in order to locate connected pixels;
   rectangularizing the located connected pixels into blocks;
   a second analyzing step for analyzing a block of pixel data in order to determine a type of image data contained in the block;
   outputting an attribute corresponding to the type of image data within the block determined in the second analyzing step in a case that the second analyzing step determines that the type of image data in the block is not unknown; and
   performing optical character recognition so as to recognize image data in the block in a case that the second analyzing step determines that the type of image data contained in the block is unknown,
   wherein, if the image data in the block is recognized, the type of image data is determined to be unknown.

2. A method according to claim 1, wherein, in the second analyzing step, the pixel data is analyzed for text data or non-text data and wherein, in the outputting step, in the case that the block of image data is determined to be text data, a text data attribute is output, or, if the data is determined to be non-text data, a non-text data attribute is output.

3. In a page analysis system for analyzing image data of a document page, a method comprising the steps of:
   dividing the image data into blocks using a block selection technique, each block including one or more connected components and having an associated type classification;
   comparing a preset threshold size range to each connected component of a block classified as text;
   performing optical character recognition on connected components in the text block when it is determined that most connected components in the block have a size that is outside the preset threshold size; and
   reclassifying the block as other than text when it is determined as a result of performing the optical character recognition that most connected components in the block are unrecognizable.

4. A method according to claim 3, wherein in reclassifying the block as other than text, the block is reclassified as picture data when it is determined as a result of performing the optical character recognition that most connected components in the block are unrecognizable.

5. A method according to claim 3, wherein the optical character recognition is performed in a case that most connected components in the block have a size that is greater than the preset size threshold.

6. A method according to claim 3, wherein the optical character recognition is performed in a case that most connected components in the block have a size that is less than the preset size threshold.

7. A method according to claim 3, wherein the size threshold is based on an average size of connected components in the image data of the document page.

8. Computer-executable process steps stored in a computer-readable medium, the process steps for use in a page analysis system for analyzing image data of a document page, the process steps comprising:

an inputting step to input image data of a document page as pixel data;

a first analyzing step to analyze the pixel data in order to locate connected pixels;

a rectangularizing step to rectangularize the located connected pixels into blocks;

a second analyzing step to analyze a block of pixel data in order to determine a type of image data contained in the block;

an outputting step to output an attribute corresponding to the type of image data within the block determined in the second analyzing step in a case that the type of image data within the block is not determined to be unknown in the second analyzing step; and a performing step to perform optical character recognition so as to recognize image data of the block in a case that the type of image data contained in the block is determined to be unknown in the second analyzing step, wherein, if the image data in the block is recognized, the type of image data is determined to be unknown.

9. Computer-executable process steps according to claim 8, wherein, in the second analyzing step, the pixel data is analyzed for text data or non-text data and wherein, in the outputting step, in the case that the block of image data is determined to be text data, a text data attribute is output, or, if the data is determined to be non-text data, a non-text data attribute is output.

10. Computer-executable process steps for analyzing image data of a document page, the steps comprising:

a dividing step to divide the image data into blocks using a block selection technique, each block including one or more connected components and having an associated type classification;

a comparing step to compare a preset threshold size range to each connected component of a block classified as text;

a performing step to perform optical character recognition on the connected components in the text block when it is determined that most connected components in the block have a size that is outside the preset threshold size; and a reclassifying step to reclassify the block as other than text when it is determined as a result of performing the optical character recognition that most connected components in the block are unrecognizable.

11. Computer-executable process steps according to claim 10, wherein the reclassifying step reclassifies the block as picture data when it is determined as a result of performing the optical character recognition that most connected components in the block are unrecognizable.

12. Computer-executable process steps according to claim 10, wherein the optical character recognition is performed in a case that most connected components in the block have a size that is greater than the preset size threshold.

13. Computer-executable process steps according to claim 10, wherein the optical character recognition is performed in a case that most connected components in the block have a size that is less than the preset size threshold.

14. Computer-executable process steps according to claim 10, wherein the size threshold is based on an average size of connected components in the image data of the document page.

15. An apparatus for performing page analysis of a document page, the apparatus comprising:

a memory which stores page analysis process steps executable by a processor and an image of a document page; and a processor which executes the page analysis process steps stored in the memory (1) to input image data of a document page as pixel data, (2) to analyze the pixel data in order to locate connected pixels, (3) to rectangularize the located connected pixels into blocks, (4) to analyze a block of pixel data in order to determine a type of image data contained in the block, (5) to output an attribute corresponding to the type of image data within the block in a case that the type of image data within the block is not determined to be unknown, and (6) to perform optical character recognition to attempt to recognize a character of the block of image data in a case that the type of image data contained in the block is determined to be unknown, wherein, if the image data in the block is recognized, the type of the image data is determined to be unknown.

16. An apparatus according to claim 15, wherein the processor analyzes each block of pixel data in order to determine a type of image data contained in each block by analyzing the pixel data for text data or non-text data; and wherein the processor outputs (1) a text data attribute in a case that the block of image data is determined to be text data, or (2) a non-text data attribute in a case that the data is determined to be non-text data.

17. An apparatus for analyzing image data of a document page, the apparatus comprising:

a memory which stores page analysis process steps executable by a processor and an image of a document page; and a processor which executes the page analysis process steps stored in the memory (1) to divide the image data into blocks using a block selection technique, each block including one or more connected components and having an associated type classification, (2) to compare a preset threshold size range to each connected component of a block classified as text, (3) to perform optical character recognition on connected components in the text block when it is determined that most connected components in the block have a size that is outside the preset threshold size, and (4) to reclassify the block as other than text when it is determined as a result of performing the optical character recognition that most connected components in the block are unrecognizable.

18. An apparatus according to claim 17, wherein the processor executes process steps stored in the memory to reclassify the block as picture data when it is determined as a result of performing the optical character recognition that most connected components in the block are unrecognizable.

19. An apparatus according to claim 17, wherein the processor performs the optical character recognition in a case that most connected components in the block have a size that is greater than the preset size threshold.

20. An apparatus according to claim 17, wherein the processor performs the optical character recognition in a case that most connected components in the block have a size that is less than the preset size threshold.

21. An apparatus according to claim 17, wherein the size threshold is based on an average size of connected components in the image data of the document page.

22. A method according to claim 1, wherein, if the image data in the block is not recognized, the type of image data contained in the block is determined to be picture data.

23. Computer-executable process steps according to claim 8, further comprising an outputting step to output a picture attribute in a case that the image data of the block is not recognized in said performing step.

24. An apparatus according to claim 15, wherein the processor executes the page analysis process steps stored in the memory to output a picture attribute in a case that a character of the block of image data is not recognized.

* * * * *

UNITED STATES PATENT AND TRADEMARK OFFICE
CERTIFICATE OF CORRECTION

PATENT NO. : 6,512,848 B2
DATED : January 28, 2003
INVENTOR(S) : Shin-Ywan Wang

It is certified that error appears in the above-identified patent and that said Letters Patent is hereby corrected as shown below:

Column 1,
Line 58, "102, 104 to 106," to -- 103 to 106, --.

Column 4,
Line 62, "is-completely" should read -- is completely --.

Column 5,
Line 7, "connectedcomponent," should read -- connected component, --;
Line 42, "one-of" should read -- one of --; and
Line 56, "was-" should read -- was --.

Column 6,
Line 1, "block-" should read -- block --; and
Line 27, "cessabie" should read -- cessable --.

Signed and Sealed this

Thirtieth Day of September, 2003

JAMES E. ROGAN
*Director of the United States Patent and Trademark Office*